L. C. FREEMAN.
VEHICLE BRAKE.
APPLICATION FILED SEPT. 15, 1913.

1,162,048.

Patented Nov. 30, 1915.
2 SHEETS—SHEET 1.

WITNESSES

INVENTOR
Lowell C. Freeman
BY
Raymond A. Parker
ATTORNEY

L. C. FREEMAN.
VEHICLE BRAKE.
APPLICATION FILED SEPT. 15, 1913.
1,162,048.
Patented Nov. 30, 1915.
2 SHEETS—SHEET 2.
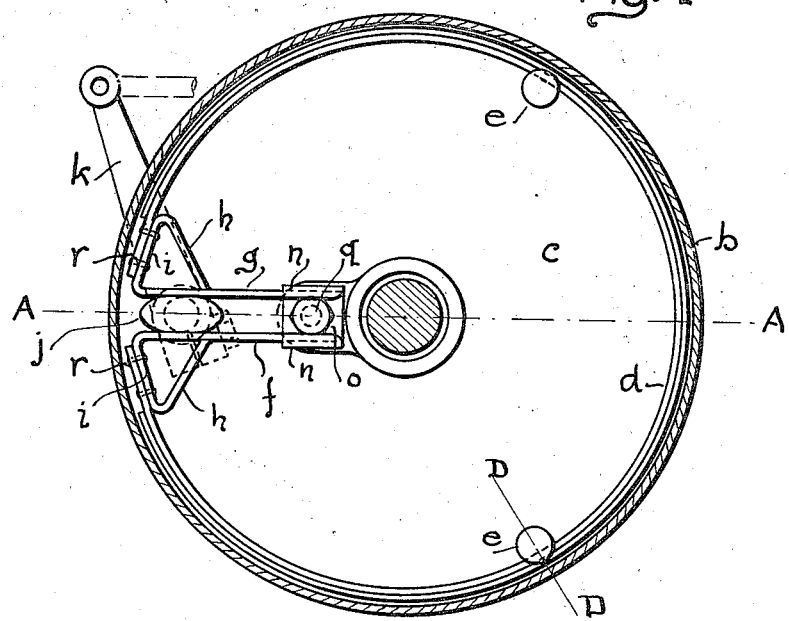
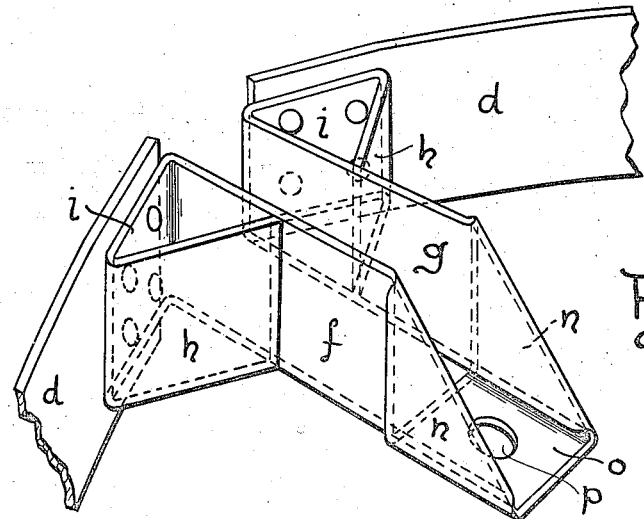
WITNESSES
INVENTOR
Lowell C. Freeman
BY
Ralzemond A. Parker.
ATTORNEY

UNITED STATES PATENT OFFICE.

LOWELL C. FREEMAN, OF DETROIT, MICHIGAN.

VEHICLE-BRAKE.

1,162,048.

Specification of Letters Patent.

Patented Nov. 30, 1915.

Application filed September 15, 1913. Serial No. 789,774.

*To all whom it may concern:*

Be it known that I, LOWELL C. FREEMAN, a citizen of the United States, residing at Detroit, county of Wayne, State of Michigan, have invented a certain new and useful Improvement in Vehicle-Brakes, and declare the following to be a full, clear, and exact description of the same, such as will enable others skilled in the art to which it pertains to make and use the same, reference being had to the accompanying drawings, which form a part of this specification.

My invention relates to vehicle brakes and an object of my improvements is to provide a brake that is simple in construction and easy and inexpensive to manufacture, light in weight, and having no joints, pins or other moving connections to wear or rattle.

Figure 1:
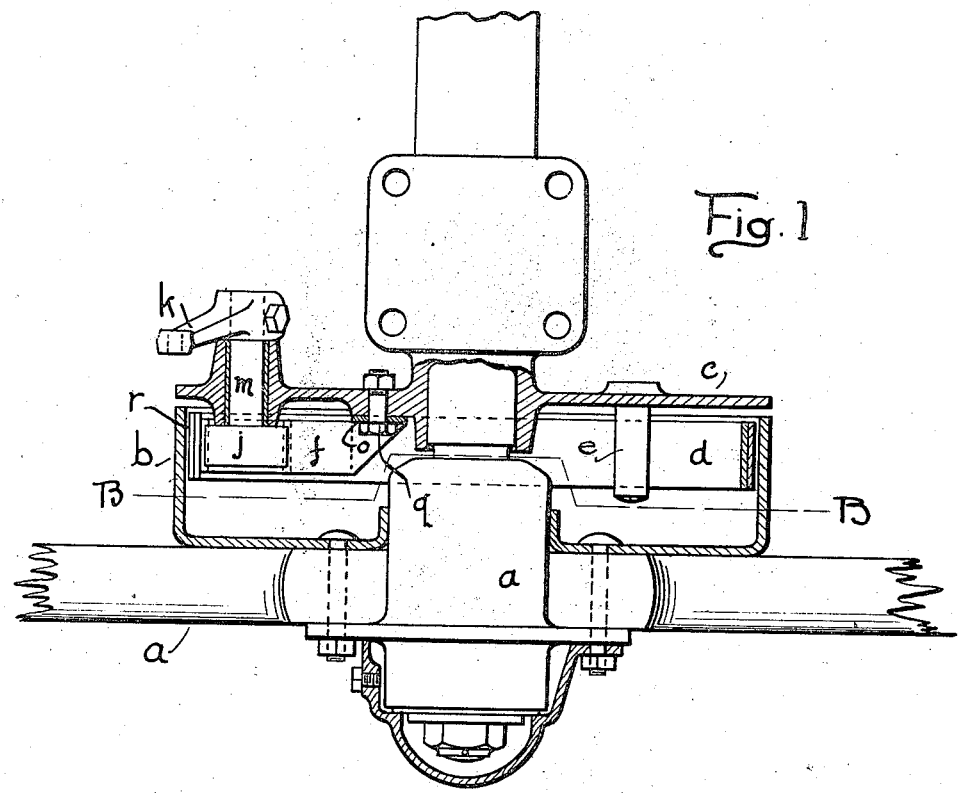
Figure 4:
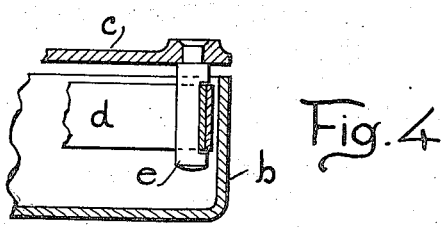

I attain this object in the device illustrated in the accompanying drawings, in which, Figure 1, is a sectional view of a device embodying my invention and so much of a vehicle as is necessary to illustrate its connection therewith, the section being taken approximately on the line A—A Fig. 2. Fig. 2, is a sectional elevation, the section being taken on the line B—B Fig. 1. Fig. 3, is a detail perspective view. Fig. 4, is a detail sectional view.

$a$ represents the wheel and $b$ is the brake drum secured to the wheel.

$c$ is a circular disk secured to a stationary portion of the vehicle as the chassis concentric with the drum $b$.

$d$ is the brake band, or split ring, located within the drum $b$ and adapted to be expanded to bear against the interior surface of the periphery of said drum.

$e, e$ are lugs or rods extending from the disk $c$ toward its periphery and into the drum $b$ and serving to center, or locate, the band $d$.

Referring more particularly to Fig. 3 $f, g, h, i, n, o$ is a strip of sheet metal bent into the form illustrated in which there are two parallel parts $f$ and $g$ extending toward the center of the brake band $d$ bent back upon themselves at their outer ends to form triangular portions having sides $i$ adapted to be riveted to the ends $r, r$ of the band $d$ and the brace portions $h, h$ which join the parts $f, g$ at some distance from their ends and are welded thereto. This forms a means for attaching the brake-band to the disk $c$ in place on the drum $b$ and also a reinforced portion toward their inner ends to receive the action of the cam $y$. The parts $f, g$ are bent over and under and the metal strip extends in a flat portion $o$ between the two portions $f$ and $g$ at their inner ends. There is a hole $p$ through the flat portion $o$.

$q$ is a bolt extending through the hole $p$ and through a corresponding hole in the plate $c$ toward the center of said plate and adapted to secure the band $d$ to the plate $c$ by securing the parts $f, g, h, i, n, o$ to said plate.

$m$ is an arbor extending through a bearing in the plate $c$ and having at its inner end the double pointed cam $j$ between the parts $f$ and $g$.

$k$ is a lever arm on the outer end of the arbor $m$.

The parts $f$ and $g$ are made resilient so that their action shall be to hold the band $d$ out of engagement with the periphery of the drum $b$, except when the cam $j$ is turned to separate said parts and expand the band until it engages the periphery of the drum $b$.

It will be seen that in the above device the forces come almost exclusively upon the cam $j$ and the arbor $m$.

It will be noticed that the construction is very simple, that the parts $f, g, h, i, n, o$, may be rolled and easily formed to the shape described and conveniently assembled.

What I claim is:

1. The combination of a drum, a band formed in the arc of a circle within said drum and adapted to engage the same when bent outward, a part extending from each end of said band inward toward the center of the circle of the arc in which said band is bent, and means for securing said parts at their inner ends to a stationary support to secure said band in place one of said inwardly extending parts being adapted to yield to bend said band.

2. The combination of a drum, a brake band formed in the arc of a circle within said drum and adapted to engage the same, a resilient part extending inward from the one end of said band toward the center of a circle in an arc of which said band is bent, means for securing the inner end of said part to a stationary part to secure said band in place, and means for bending said part to expand said ring.

3. The combination of a drum, a brake band therein formed in the arc of a circle and adapted to engage said drum when bent outward, a part extending from each end of said band inward toward the center of the circle of the arc in which said band is bent, means for securing said parts toward their inner ends to a stationary support and a cam adapted to act against the inner surfaces of said parts to expand said band, one of said inwardly extending parts being adapted to yield to bend said band.

4. The combination of a drum, a curved brake band therein adapted to be bent outward to engage said drum, a part secured to each end of said band and extending toward the center of the circle in which the band is bent, the inner ends of said parts being joined together to form an attaching part, and means for securing said attaching part to a stationary support to hold the band in place.

5. The combination of a brake band, a strip of metal bent to be secured to one end of said brake band, extending inward, then at right angles, then outward and adapted to be secured to the other end of said band.

6. The combination of a brake band, a strip of metal secured to one end of said band extending inward then at right angles so as to form an attaching part then outward and adapted to be secured to the other end of said band.

7. The combination with a brake band of a metal strip bent at one part to form an attaching means adapted to be secured to one end of said band, said strip extending inward on one side of the attached part and being bent at the other side of said attaching part to extend inwardly and come against said inwardly extending part to form a brace for the latter.

8. The combination of a brake band, a strip of metal attached to one end of said band, then extending approximately radially inward, then bent over upon itself on a line slanting from its upper to its lower edge, and then bent over its lower edge to extend at right angles thereto in the plane of said band to form a securing part.

In testimony whereof, I sign this specification in the presence of two witnesses.

LOWELL C. FREEMAN.

Witnesses:
   VIRGINIA C. SPRATT,
   AGNES M. HIPKINS.